Dec. 2, 1969  H. G. HAYES  3,481,247
TOOL HEIGHT SETTING APPARATUS
Filed Oct. 23, 1967
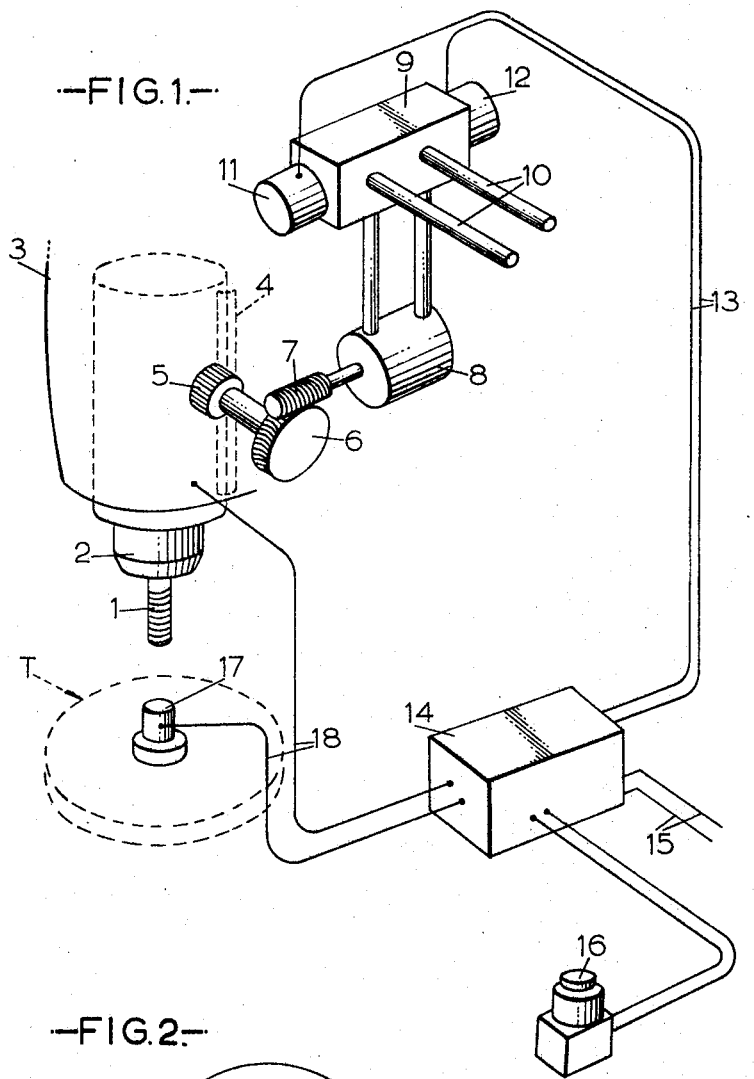
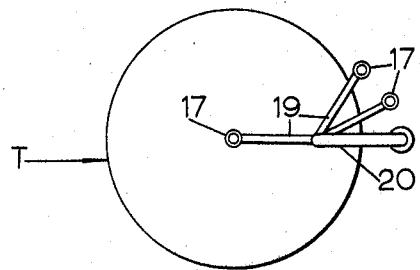
INVENTOR:
Hubert George Hayes,
BY
Price, Scheffler & Parker
his Attorneys United States Patent Office 3,481,247
Patented Dec. 2, 1969

3,481,247
TOOL HEIGHT SETTING APPARATUS
Hubert George Hayes, Bardsey, England, assignor to Hayes Engineers (Leeds) Limited, Leeds, England, a British company
Filed Oct. 23, 1967, Ser. No. 677,329
Claims priority, application Great Britain, Nov. 23, 1966, 52,448/66
Int. Cl. B23c 7/00; B23b 47/26
U.S. Cl. 90—11                                    7 Claims

ABSTRACT OF THE DISCLOSURE

Apparatus for depth setting on a machine tool comprising control means including an electrical "operating" circuit closable by switch means to actuate operating means to cause relative movement between the machine cutting tool and a height gauge positioned in line therewith and a low voltage electrical "sensing" circuit to be closed when said tool engages said gauge which opens the "operating" circuit to arrest said relative movement.

---

This invention relates to the control of machine tools and particularly to depth control devices. It particularly relates to milling, drilling or other machines, hereafter generally referred to as a machine tool, where there is relative axial movement between tool and work piece, and accurate distance setting in a line axial to the tool is required to determine cutting to a given depth.

Hitherto the axial setting of a cutter in a milling spindle, or a drill in a drilling machine spindle, relative to a work piece, or vice versa, so as to set the depth of cutting required, has normally been carried out by manually setting the appropriate part by means of graduated dials, slip or dial gauges, pre-fixed blocks and feeler gauges or the like. In modern machine tools, it is known for the actual cutting tool to be set to a certain protrusion by means of a microscope in a loose chuck which takes an accurate location in the machine spindle. In this case the spindle is used as a datum and various tool protrusions are set to such datam for giving different axial lengths in similar interchangeable chucks. Thus the final accurate setting in each of the above cases is carried out manually and, as this demands a reasonable level of skill, the full responsibility is on the tool setter.

The main object of the present invention is to deal with the problem with accuracy and by automatic means.

According to the present invention there is provided a method of setting a relative accurate distance between the tool and work piece on a machine tool to provide a datum, consisting in arranging the "operating" circuit of an electrical system to control operating means which give axial relative movement between a tool and work piece, incorporating the tool or work piece and a height gauge element in a "sensing" circuit of said system as engageable contacts, setting the height gauge to a required datum relative to the work piece or the tool (whichever is to remain stationary), arranging switching means to close the "operating" circuit of said system to cause movement of the tool or work piece (which ever is acting as a contact) until it engages the said gauge element contact, whereupon closure of the "sensing" circuit will cause the tool or work piece movement to cease.

The invention includes control means for a machine tool of the aforesaid type, said means comprising drive means for the mounting carrying the tool or work piece to cause relative movement between them, an electrical "operating" circuit for controlling said drive means, an associated electrical "sensing" circuit incorporating the tool (or work piece) and a height gauge as contacts, and arranging the drive means to be stopped through the medium of the circuits when the contacts engage one another.

The drive means may comprise a valve controlled hydraulic motor and gearing with electrical control of the valve means, or an electric motor.

The invention will now be more fully described with reference to the accompanying diagrammatic drawing, in which:

FIG. 1 is a schematic layout of the invention employing a hydro-electric control arrangement; and FIG. 2 is a detail plan of one form of mounting for several height gauges.

In a particular embodiment of this invention for a milling machine, a milling cutter 1 is adapted to be mounted into either an interchangeable tool holder or directly into the nose of the milling spindle which may be mounted in a quill 2 in a machine head 3. In this manual operation of mounting the only requirement is that the tool should protrude by an amount sufficient to ensure the required cutting length, i.e., if a cavity is to be milled to a depth of 2 inches the tool 1 should project, say, 2¼ inches or more, and setting by means of a ruler will give sufficient accuracy. This tool is operable to move axially towards a fixed work piece in a work piece holder on the machine work table T and in this invention the quill 2 can be operated by a rack 4 and pinion 5 driven through feed mechanism comprising a worm wheel 6 driven by a worm 7 from a hydraulic motor 8 controlled by a changeover valve 9 connected to a hydraulic system 10. The valve can be operated by a pair of solenoids 11, 12, with their electrical circuit 13 connected to a control box 14 incorporating a low voltage supply system 15, switching means of a known type and the like. This control box incorporates a push button (or other) switch 16 for initiating movement of the aforesaid quill 2, or such control may be replaced by an automatic signal or like system.

At least one height gauge element 17 is provided capable of being moved into axial alignment with the milling tool 1, and this gauge is connected together with the machine tool head 3 or other part (for the passage of a low voltage current) by a low voltage electrical circuit 18 to the aforesaid control box 14. The arrangement is such that this height gauge element 17 and the cutter 1 will form electrical contacts in what may be termed a "sensing" circuit so that when the cutter and gauge meet they will close the circuit 18 which through the control box 14 will operate the change-over valve 9 to shut off the fluid supply to the hydraulic motor 8 and thus arrest movement of the cutter 1. This operation may also apply locking means. The height gauge element 17 thus acts as a stop and if necessary can be spring loaded to prevent damage should the response of the electrical and hydraulic systems not be sufficiently rapid enough to arrest the cutter movement immediately. Any such movement of the stop 17 against its spring loading could be used to energise a very slow reversal of the cutter movement to correct it to the desired position. It has been found that by selecting a suitable rate of feed for the cutter, such second correcting movement is not necessary.

It will be understood that a number of height gauges 17 may be provided on a machine tool on pivoted extensions 19 of a swing arm 20 (or other mounting) which will enable the element or elements to be moved into an operative position on or over the work table T and then to an out of the way position. By using more than one height gauge stop 17 a tool 1 can readily be set to a selected height of a range of heights, or alternatively different tools at different heights. The or each height gauge 17 may be a fixed height or adjustable within a range of heights.

It will be understood that instead of moving the tool 1, the work piece holder may be the movable part in relation to a stop element 17 so that this invention is equally applicable to this arrangement.

Although a hydraulic motor 8 and system has been referred to, there could be an electric motor and gear drive and if required some form of braking system. The change-over valve 9 would be replaced by change-over switch means.

This invention is particularly suitable for automatic tool changing, as used on numerical control "machining centres" as all the tools in the tool bank can have their appropriate height set accurately by the invention.

On numerically controlled machines which can alter the position of the work piece by energising its traverse to move the work piece closer or further away from the cutter, either as a step function or as a simultaneous movement relative to the other two traverses, again manually operated controls can be used to enable the position of the work table to be set before the automatic control of the traverses for machining purposes is applied. By using the low volt sensing system the electrical signal obtained by means of the tool and stop can be used to control this setting movement.

It is to be understood the invention is applicable to machine tools, particularly of the type described, wherein the tool axis is in a vertical, horizontal or other plane. Many numerically controlled machines have automatic changing devices in which the orientation of the machine is around a horizontal spindle.

What we claim is:

1. Control means for setting a relative accurate distance for a cutting operation between the cutting tool and a work piece on a machine tool to provide a datum, said control means including drive means for causing relative movement between two parts of which one is the cutting tool and the other is a height gauge in association with the machine work table in line with said tool, an electrical "operating" circuit for controlling said drive means, a low voltage electrical "sensing" circuit incorporating the tool and gauge as contacts, said two circuits being associated through switch means, the arrangement being such that after the drive means have been brought into operation they are automatically stopped through the medium of said two circuits when the contacts engage one another.

2. Control means according to claim 1, wherein the drive means comprise a valve controlled hydraulic motor and gearing with said electrical operating circuit controlling the valve means.

3. Control means according to claim 1, wherein the drive means comprise an electric motor and gearing with said "operating" circuit controlling the motor.

4. Control means according to claim 1, wherein the "sensing" circuit is energised from a low voltage electrical supply through switch control means.

5. Control means according to claim 1, wherein the height gauge is adjustable within a range of heights.

6. Control means according to claim 1, wherein a number of height gauges are mounted for selection and movement into an operative position.

7. Control means according to claim 1, wherein the height gauge is resiliently mounted and associated with means capable of causing a slow reversal of the relative movement between tool and gauge.

References Cited

UNITED STATES PATENTS 3,171,327   3/1965   Williamson _____ 90—11

FRANCIS S. HUSAR, Primary Examiner

U.S. Cl. X.R.

33—172, 185; 77—55